United States Patent
Jeong

(10) Patent No.: US 9,994,209 B2
(45) Date of Patent: Jun. 12, 2018

(54) APPARATUS AND METHOD FOR CONTROLLING CHARGE OF HYBRID ELECTRIC VEHICLE

(71) Applicants: Hyundai Motor Company, Seoul (KR); Kia Motors Corporation, Seoul (KR)

(72) Inventor: Won Young Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 15/256,205

(22) Filed: Sep. 2, 2016

(65) Prior Publication Data

US 2017/0297555 A1    Oct. 19, 2017

(30) Foreign Application Priority Data

Apr. 18, 2016    (KR) .................. 10-2016-0047092

(51) Int. Cl.
*B60W 10/02* (2006.01)
*B60W 10/06* (2006.01)
*B60W 10/08* (2006.01)
*B60K 6/448* (2007.10)
*B60W 20/13* (2016.01)

(52) U.S. Cl.
CPC ............. *B60W 10/02* (2013.01); *B60K 6/448* (2013.01); *B60W 10/06* (2013.01); *B60W 10/08* (2013.01); *B60W 20/13* (2016.01); *B60W 2510/0638* (2013.01); *B60W 2520/10* (2013.01); *B60W 2710/021* (2013.01); *B60W 2710/0666* (2013.01); *B60W 2710/244* (2013.01); *B60Y 2300/91* (2013.01); *B60Y 2400/112* (2013.01); *Y10S 903/93* (2013.01)

(58) Field of Classification Search
None
See application file for complete search history.

(56) References Cited

U.S. PATENT DOCUMENTS

| 2014/0067175 A1* | 3/2014 | Cho | ................. | B60L 11/14 701/22 |
| 2014/0229043 A1* | 8/2014 | Frank | .................... | B60W 20/20 701/22 |

FOREIGN PATENT DOCUMENTS

| JP | 2005-207311 A | 8/2005 |
| JP | 2015-227140 A | 12/2015 |
| KR | 10-2000-0043703 A | 7/2000 |
| KR | 10-2013-0068944 A | 6/2013 |

* cited by examiner

*Primary Examiner* — Jonathan M Dager
*Assistant Examiner* — Garrett F Evans
(74) *Attorney, Agent, or Firm* — Mintz Levin Cohn Ferris Glovsky and Popeo, P.C.; Peter F. Corless

(57) ABSTRACT

A charge control apparatus of a hybrid vehicle is provided. The apparatus adjusts charge of a hybrid vehicle based on a vehicle running state when entering a charge mode. The charge control apparatus includes an engine clutch that is disposed between an engine and a first motor to selectively connect the engine and the first motor and a battery that provides a voltage to the first motor. A data detection unit detects driving data for charging the battery and a vehicle controller generates an average speed for a predetermined time using a vehicle speed of the driving data. In addition, the controller sets a charge mode based on the average speed and charges the battery using the charge mode.

22 Claims, 12 Drawing Sheets

|  | 210 Idle charge mode | 220 Idle lock-up charge mode | 230 Engine speed charge mode | 240 Engine torque charge mode | 250 Running charge mode | 260 Regenerative braking |
|---|---|---|---|---|---|---|
| Stop state | O | X | X | X | X | X |
| Low speed running state | △ | △ | △ | O | O | O |
| Intermediate speed state | X | △ | △ | O | O | O |
| High speed running state | X | △ | △ | O | O | O |

FIG. 2

| Charge mode | Engine 110 | Engine clutch 120 | First motor 130 | Second motor 135 | Transmission 150 | Running |
|---|---|---|---|---|---|---|
| Idle charge mode (210) | drive | open | drive (running /charge) | charge | running | drive or regenerative (low power) |
| Idle lock-up charge mode (220) | drive | close | charge | stop | running | coasting |
| Engine speed charge mode (230) | drive | close | charge | stop | shift to low speed | running |
| Engine torque charge mode (240) | increase torque | close | charge | stop | running | running |
| Running charge mode (250) | drive | close | charge | stop | running | running |
| Regenerative braking (260) | stop | open | charge | stop | running | decelerate |

FIG. 9

| | Idle charge mode | Idle lock-up charge mode | Engine speed charge mode | Engine torque charge mode | Running charge mode | Regenerative braking |
|---|---|---|---|---|---|---|
| | 210 | 220 | 230 | 240 | 250 | 260 |
| Stop state | O | X | X | X | X | X |
| Low speed running state | △ | △ | △ | O | O | O |
| Intermediate speed state | X | △ | △ | O | O | O |
| High speed running state | X | △ | △ | O | O | O |

APPARATUS AND METHOD FOR CONTROLLING CHARGE OF HYBRID ELECTRIC VEHICLE

CROSS-REFERENCE TO RELATED APPLICATION

This application claims priority to and the benefit of Korean Patent Application No. 10-2016-0047092 filed in the Korean Intellectual Property Office on Apr. 18, 2016, the entire contents of which are incorporated herein by reference.

BACKGROUND

(a) Field of the Invention

The present invention relates to a charge control apparatus of a hybrid vehicle, and more particularly, to an apparatus and method for controlling charge of a hybrid vehicle that charge a battery based on a vehicle running state when entering a charge mode.

(b) Description of the Related Art

In general, a hybrid vehicle is a vehicle that is driven with efficient combination of at least two types of power sources. However, many hybrid vehicles indicate vehicles that obtain a driving torque with an engine that obtains a driving torque by burning fuel and a drive motor that is driven with power of a battery, which is a rechargeable battery. Nowadays, by forming a battery capacity to be greater than that of a conventional hybrid vehicle and by charging a battery with an external power source, a plug-in hybrid vehicle that runs in only an electric vehicle (EV) mode upon near distance running and that runs in a hybrid electric vehicle (HEV) mode when the battery is depleted has been developed.

In other words, a plug-in hybrid electric vehicle (PHEV) is a type of vehicle that may include both an internal combustion engine driven with gasoline and a battery engine to be driven using one of two engines or both engines, as in an existing hybrid vehicle, and includes a large capacity of high voltage battery to be charged with external electricity. The PHEV provides an electric vehicle (EV) mode that runs with a torque of a drive motor, a hybrid electric vehicle (HEV) mode that runs with the sum of an engine torque and a motor torque, and a charge mode that drives an engine to charge a battery.

Since the PHEV charges a battery in a high speed running mode having good charge efficiency using a charge mode and runs in an EV mode using a charged battery in a low speed and low load running mode, fuel consumption may be improved. In other words, in a conventional charge mode, since a battery is charged rapidly instead of being charged based on a driving situation, charge efficiency of the battery may be decreased.

The above information disclosed in this section is merely for enhancement of understanding of the background of the invention and therefore it may contain information that does not form the prior art that is already known in this country to a person of ordinary skill in the art.

SUMMARY

The present invention provides an apparatus and method for controlling charge of a hybrid vehicle having advantages of charging a battery based on a vehicle running state when entering a charge mode. The present invention has been made in an effort to further provide an apparatus and method for controlling charge of a hybrid vehicle having advantages of constantly managing a charge speed by calculating a battery charge speed per unit time.

An exemplary embodiment of the present invention provides a charge control apparatus of a hybrid vehicle that may include: an engine clutch disposed between an engine and a first motor to selectively connect the engine and the first motor; a battery that provides a voltage to the first motor; a data detection unit configured to detect driving data for charging the battery; and a vehicle controller configured to generate an average speed for a predetermined time using a vehicle speed of the driving data and set a charge mode based on the average speed and charge the battery through the charge mode.

The vehicle controller may be configured to determine a stop state and charge the battery through an idle charge mode based on the stop state, when the average speed is a first predetermined value. In the idle charge mode, the engine clutch may be in an open state, and the battery may be charged based on at least one of a first motor and a second motor. The vehicle controller may further be configured to determine a low speed running state and charge the battery through at least one of an engine torque charge mode, a running charge mode, and regenerative braking based on the low speed running state, when the average speed is less than a second predetermined value. In the engine torque charge mode, the engine clutch may be in a closed state, the battery may be charged based on a first motor by increasing an output torque of the engine, and in the running charge mode, the engine clutch may be in a closed state, the battery may be charged based on the first motor, when running energy is greater than output energy of the engine.

The vehicle controller may be configured to determine whether a heater is in an on state, when the average speed is less than a second predetermined value, and the vehicle controller may be configured to charge the battery through an idle charge mode, which is a low speed charge mode, when a heater is in an on state. The vehicle controller may then be configured to determine whether a battery charge amount is less than a first reference amount, when the heater is in an off state, charge the battery through at least one of an idle lock-up charge mode and an engine speed charge mode, when the battery charge amount is less than a first reference amount, and charge the battery through the engine speed charge mode, when the battery charge amount is equal to or greater than a first reference amount.

In the idle lock-up charge mode, the engine clutch may be in a closed state, the battery may be charged through the first motor by driving the engine, and in the engine speed charge mode, the engine clutch may be in a closed state, by increasing a rotation speed of the engine, the battery may be charged using the first motor. The vehicle controller may be configured to determine an intermediate speed running state, when the average speed is between a second predetermined value and a third predetermined value and charge the battery through at least one of an engine torque charge mode, a running charge mode, and regenerative braking in an intermediate speed charge mode or a high speed charge mode based on the intermediate speed running state.

Additionally, the vehicle controller may be configured to determine a high speed running state, when the average speed is equal to or greater than a third predetermined value and charge the battery through at least one of an engine torque charge mode, a running charge mode, and regenerative braking in an intermediate speed charge mode or a high speed charge mode based on the high speed running state. The vehicle controller may be configured to determine a battery charge amount, when the average speed is between a second predetermined value and a third predetermined value, charge the battery through at least one of an idle lock-up charge mode and an engine speed charge mode, when the battery charge amount is less than a second reference amount, and charge the battery through an engine speed charge mode, when the battery charge amount is equal to or greater than a second reference amount. The vehicle controller may further be configured to determine a battery charge amount, when the average speed is equal to or greater than a third predetermined value, charge the battery through at least one of an idle lock-up charge mode and an engine speed charge mode, when the battery charge amount is less than a third reference amount, and charge the battery through an engine speed charge mode, when the battery charge amount is equal to or greater than a third reference amount.

Another exemplary embodiment of the present invention provides a method of controlling charge of a hybrid vehicle that may include: measuring a vehicle speed; generating an average speed for a predetermined time using the vehicle speed; adjusting, when the average speed is a first predetermined value, a charge mode based on a stop state; adjusting, when the average speed is less than or equal to a second predetermined value, a charge mode based on a low speed running state; adjusting, when the average speed exists between a second predetermined value and a third predetermined value, a charge mode based on an intermediate speed running state; and adjusting, when the average speed is equal to or greater than a third predetermined value, a charge mode based on a high speed running state.

According to the present invention, when entering a charge mode, a battery may be charged based on a vehicle running state and thus fuel consumption may be improved. Further, by calculating a battery charge speed per unit time, a charge speed may be constantly managed and thus durability of the battery may be improved. In addition, an effect that may be obtained or estimated due to an exemplary embodiment of the present invention may be directly or implicitly described in a detailed description of an exemplary embodiment of the present invention. In other words, various effects that are estimated according to an exemplary embodiment of the present invention will be described within a detailed description to be described later.

BRIEF DESCRIPTION OF THE DRAWINGS

The above and other objects, features and advantages of the present disclosure will be more apparent from the following detailed description taken in conjunction with the accompanying drawings:

FIG. 2 is a table illustrating a charge mode according to an exemplary embodiment of the present invention;

FIG. 9 is a table illustrating a charge mode according to a running state according to an exemplary embodiment of the present invention;

DETAILED DESCRIPTION

Figure 1:
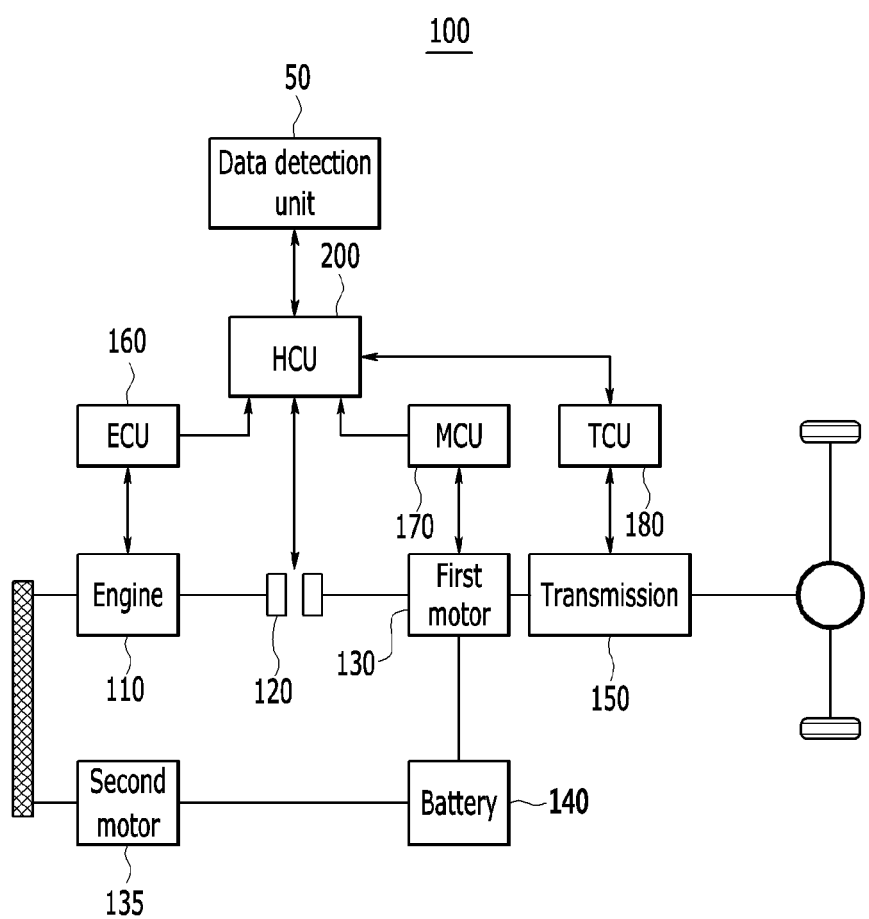
FIG. 1 is a block diagram illustrating a charge control apparatus of a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an operation principle of an apparatus and method for controlling charge of a hybrid vehicle according to an exemplary embodiment of the present invention will be described in detail with reference to the accompanying drawings and description. However, drawings shown hereinafter and a detailed description to be described later relate to an exemplary embodiment among several exemplary embodiments for effectively describing a characteristic of the present invention. Therefore, the present invention is not limited to only the following drawing and description. Detailed descriptions of well-known functions and structures incorporated herein may be omitted to avoid obscuring the subject matter of the present invention. The terms used herein are defined in consideration of functions of the present invention and may vary depending on a user's or an operator's intension and usage. Therefore, the terms used herein should be understood based on the descriptions made herein.

Further, the following exemplary embodiment may use terms by appropriately changing, integrating, or separating to be clearly understood by a person of ordinary skill in the art in order to efficiently describe a core technical characteristic of the present invention, but the present invention is not limited thereto. Hereinafter, an exemplary embodiment of the present invention will be described in detail with reference to the accompanying drawings.

FIG. 1 is a block diagram illustrating a charge control apparatus of a hybrid vehicle according to an exemplary embodiment of the present invention. Referring to FIG. 1, a charge control apparatus 100 (hereinafter, referred to as a 'charge control apparatus') of the hybrid vehicle may include a data detector 50, an engine 110, an engine clutch 120, a first motor 130, a second motor 135, a battery 140, a transmission 150, an engine control unit 160 (hereinafter, referred to as an 'ECU'), a motor control unit 170 (hereinafter, referred to as an 'MCU'), a transmission control unit 180 (hereinafter, referred to as a 'TCU'), and a hybrid control unit 200 (hereinafter, referred to as an 'HCU'). The various control units may be operated by a single controller.

In power delivery of the hybrid vehicle, power generated in the engine 110 or the first motor 130 may be selectively transferred to an input shaft of the transmission 150, and power output from an output terminal of the transmission 150 may be transferred to an axle via a differential gear device. As the axle rotates a driving wheel, the hybrid vehicle may be driven by power generated in the engine 110 or the first motor 130. The data detection unit 50 may be configured to detect information for adjusting charge of the battery 140 in the hybrid vehicle and may be configured to transmit the detected information to the HCU 200. For example, the data detection unit 50 may be configured to detect general driving data including an engine speed and an engine torque of the engine 110, a motor rotation speed of the first motor 130, a vehicle speed, a location value of an accelerator pedal (e.g., an engagement degree), and a location value of a brake pedal (e.g., an engagement degree) in driving of the hybrid vehicle.

The engine 110 burns fuel to generate power. In other words, for the engine 110, various known engines 110 such as a gasoline engine or a diesel engine using existing fossil fuel may be used. An output of the engine 110 may be adjusted by the operation of the ECU 160, and driving of the engine 110 may be adjusted to an optimal driving point by the operation of the ECU 160. The first motor 130 may be operated by a three phase alternating current (AC) voltage applied from the MCU 170 to generate a torque. The first motor 130 may operate as a generator upon coasting or regenerative braking to supply a voltage to the battery 140. The second motor 135 may be connected with the engine 110. In other words, the second motor 135 may be connected with the engine 110 via a belt. The second motor 135 may be configured to start the engine 110 or when the engine 110 is started, the second motor 135 may operate as a generator to generate electrical energy. Further, the second motor 135 may operate as a generator by driving of the engine 110 to supply a voltage to the battery 140. Such a second motor 135 may be referred to as a hybrid starter & generator (HSG).

Further, the engine clutch 120 may be disposed between the engine 110 and the first motor 130 and may be operated by the HCU 200 to connect or disconnect power delivery between the engine 110 and the first motor 130. In other words, the engine clutch 120 may connect or disconnect power between the engine 110 and the first motor 130 based on switch of an electric vehicle (EV) mode and a hybrid electric vehicle (HEV) mode. The battery 140 may include a plurality of unit cells, and at the battery 140, a high voltage for providing a driving voltage to the first motor 130 may be stored. The battery 140 may be configured to supply a driving voltage to the first motor 130 in an EV mode or an HEV mode and may be charged with a voltage generated in the first motor 130 upon regenerative braking.

When commercial power is plug-in connected (e.g., a wired connection), the battery 140 may be charged by a voltage and a current supplied through a charge device. The transmission 150 may be configured to adjust a shift ratio based on the operation of the HCU 200 and distribute an output torque added and applied through the engine clutch 120 based on a driving mode with a shift ratio to transfer the distributed output torque to a driving wheel, thereby enabling the vehicle to be driven. For the transmission 150, an automatic transmission or a continuously variable transmission may be applied. Additionally, for the transmission 150, a multistage transmission may be applied. In other words, the transmission 150 may be formed with a plurality of gear shift stages.

Furthermore, the ECU 160 may connected with the HCU 200 via a network and may be interlocked with the HCU 200 to operate the engine 110 based on an operation state of the engine 110 such as a driver's demand torque signal, a coolant temperature, and an engine torque. The ECU 160 may be configured to transmit an operation state of the engine 110 to the HCU 200. The MCU 170 may be configured to adjust drive and torque of the first motor 130 based on the operation of the HCU 200 and store electricity generated in the first motor 130 at the battery 140 upon regenerative braking. The MCU 170 may be configured to apply a three phase AC voltage to the first motor 130 and the second motor 135. The TCU 180 may be configured to adjust a shift ratio based on each output torque of the ECU 160 and the MCU 170 and operate the transmission 150 such as determining a regenerative braking amount. The TCU 180 may be configured to transmit an operation state of the transmission 150 to the HCU 200.

The HCU 200 may be an uppermost controller configured to adjust the hybrid driving mode setting and operate an environmentally-friendly vehicle. The HCU 200 may be configured to integrally operate subordinate control units connected via a controller area network (CAN) communication network, collect and analyze information of each subordinate control unit, execute a cooperation control, and adjust an output torque of the engine 110 and the first motor 130. The HCU 200 may be configured to generate an average speed for a predetermined time using a vehicle speed of driving data. In particular, a predetermined time represents a time set to generate an average speed and may be a predetermined value. For example, the HCU 200 may be configured to generate an average speed of a vehicle speed measured per minute for about 5 minutes.

The HCU 200 may be configured to determine a running state based on an average speed and set a charge mode based on the running state to charge the battery 140. In particular, the charge mode may include an idle charge mode, an idle look-up charge mode, an engine speed charge mode, an engine torque charge mode, a running charge mode, and regenerative braking. A detailed description of such a charge mode will be described with reference to FIGS. 2 to 7. For such an object, the HCU 200 may be implemented into at least one processor operating by a predetermined program, and the predetermined program may include a series of instructions for performing each step that is included in a method of controlling charge according to an exemplary embodiment of the present invention to be described later. Such a method of controlling charge will be described in detail with reference to FIGS. 2 and 3.

Figure 4:
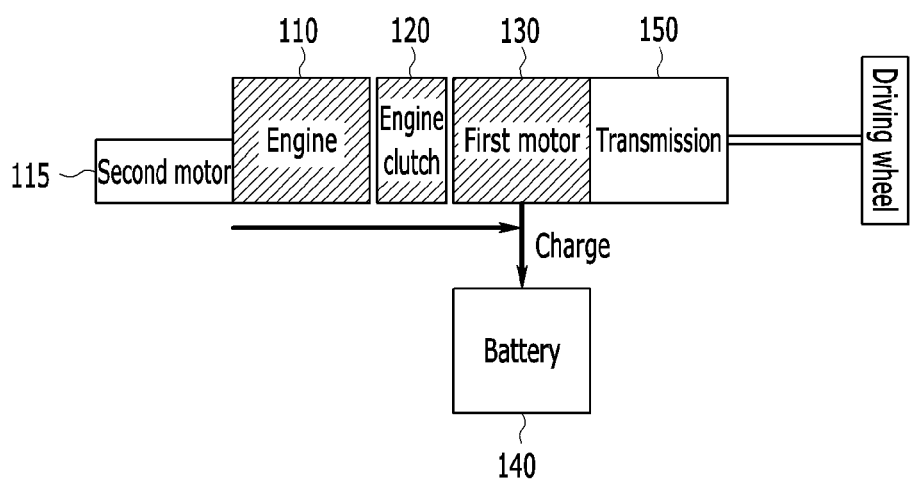
FIG. 4 is a block diagram illustrating an idle lock-up charge mode according to an exemplary embodiment of the present invention.
Figure 5:
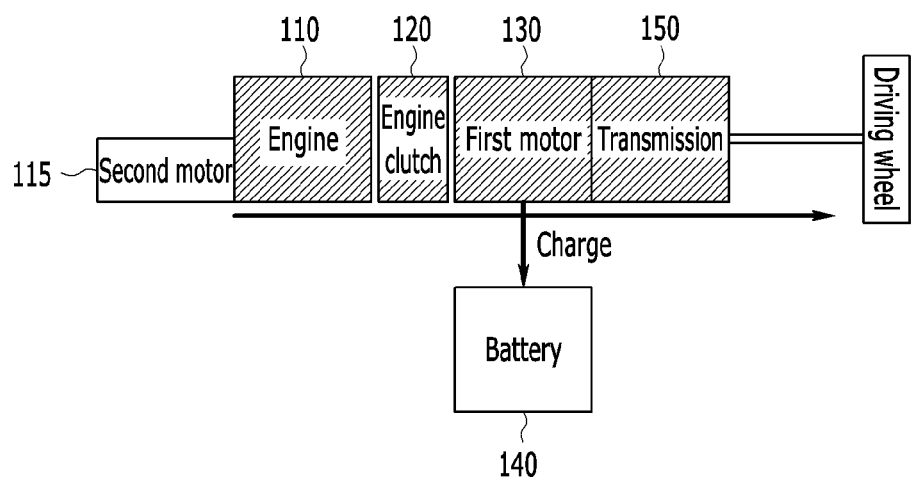
FIG. 5 is a block diagram illustrating an engine speed charge mode according to an exemplary embodiment of the present invention.
Figure 6:
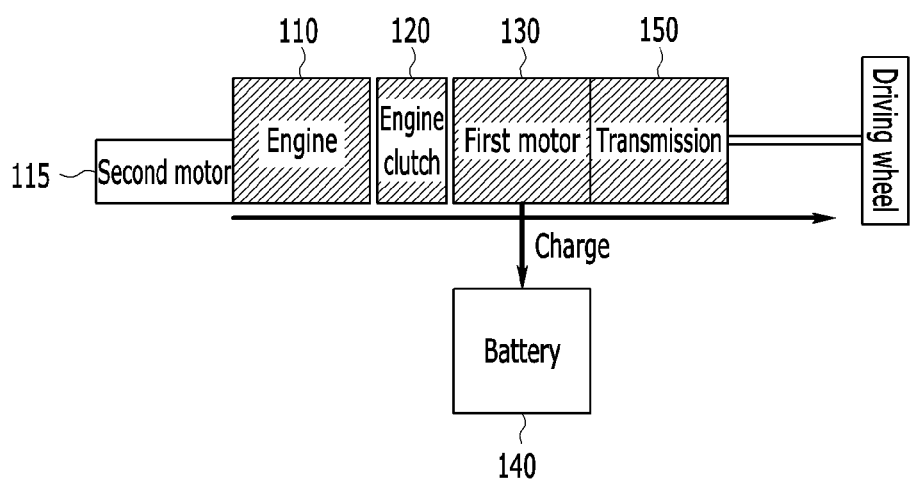
FIG. 6 is a block diagram illustrating an engine torque charge mode according to an exemplary embodiment of the present invention.
Figure 7:
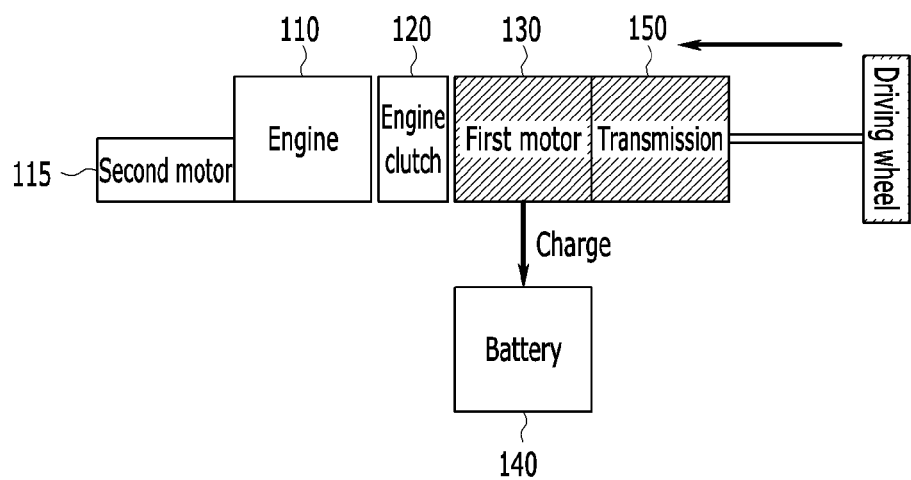
FIG. 7 is a block diagram illustrating regenerative braking according to an exemplary embodiment of the present invention.

In a vehicle according to the present invention including the function, a common operation may be executed equally to or similarly with that of a conventional vehicle and therefore a detailed description thereof will be omitted. Hereinafter, a charge mode according to an exemplary embodiment of the present invention will be described with reference to FIGS. 2 to 7. FIG. 2 is a table illustrating a charge mode according to an exemplary embodiment of the present invention, FIG. 3 is a block diagram illustrating an idle charge mode according to an exemplary embodiment of the present invention, FIG. 4 is a block diagram illustrating an idle lock-up charge mode according to an exemplary embodiment of the present invention, FIG. 5 is a block diagram illustrating an engine speed charge mode according to an exemplary embodiment of the present invention, FIG. 6 is a block diagram illustrating an engine torque charge mode according to an exemplary embodiment of the present invention, and FIG. 7 is a block diagram illustrating regenerative braking according to an exemplary embodiment of the present invention.

Figure 3:
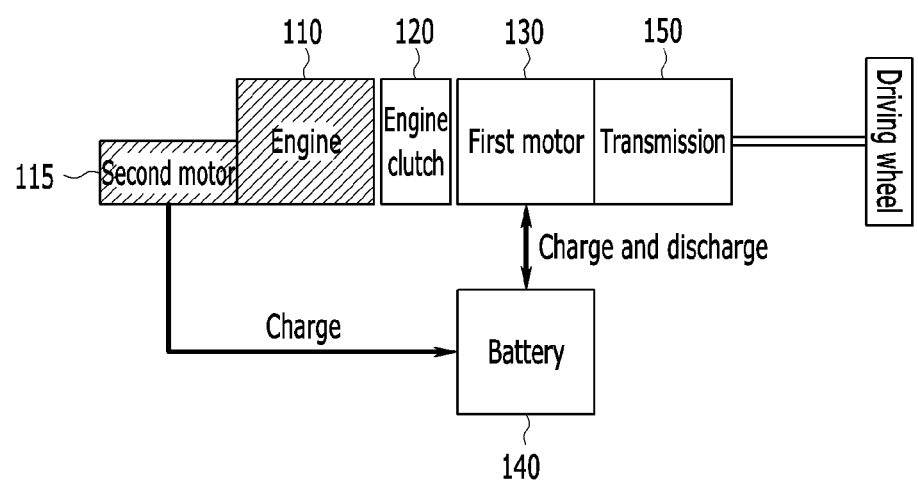
FIG. 3 is a block diagram illustrating an idle charge mode according to an exemplary embodiment of the present invention.

Referring to FIGS. 2 and 3, in an idle charge mode 210, the engine clutch 120 disposed between the engine 110 and the first motor 130 may be in an open state, and the hybrid vehicle may be operated by the first motor 130 or the battery 140 may be charged using the first motor 130. Further, in the idle charge mode 210, the battery 140 may be charged using the second motor 135 by driving of the engine 110. Referring to FIGS. 2 and 4, an idle lock-up charge mode 220 represents a closed state of the engine clutch 120 in a condition that runs with lower request power by a vehicle state, and in the idle lock-up charge mode 220, the battery 140 may be charged using the first motor 130 by driving the engine 110. In the idle lock-up charge mode 220, since charge power by the first motor 130 may be greater than charge power by the second motor 135, the idle lock-up charge mode 220 is advantageous in engine efficiency and charge efficiency. For example, in a conventional case, running energy may be represented with Equation 1.

$$\text{Running energy (5 kW)} = \text{discharge amount (5 kW) of the first motor 130} \quad \text{Equation 1}$$

However, in the idle lock-up charge mode 220 according to an exemplary embodiment of the present invention, running energy may be represented with Equation 2.

$$\text{Running energy (5 kW)} = \text{driving energy (20 kW) of the engine 110} - \text{charge amount (15 kW) of the first motor 130} \quad \text{Equation 2}$$

Referring to FIGS. 2 and 5, in an engine speed charge mode 230, the engine clutch 120 may be in a closed state and may be driven by the engine 110, and a remaining torque thereof may be charged using the first motor 130, however, to increase a charge amount of the first motor 130, when the transmission is shifted to a lower speed, a torque of the engine 110 increases upon running and thus output energy of the engine 110 increases. For example, a shift to a lower speed may be a shift from 6th gear to 5th gear and a shift from 5th gear to 4th gear. In the engine speed charge mode 230, the battery 140 may be charged using the first motor 130 using increased output energy. For example, before shifting to a low speed, a charge amount of the first motor 130 may be represented with Equation 3.

$$\text{Charge amount (5.9 kW) of the first motor 130} = \text{engine output energy (2000RPM, 100 Nm: 20.9 kW)} - \text{running energy (15 kW)} \quad \text{Equation 3}$$

However, a charge amount of the first motor 130 in which the engine speed charge mode 230 according to an exemplary embodiment of the present invention may be shifted to a lower speed may be represented with Equation 4.

$$\text{Charge amount (5.9 kW) of the first motor 130} = \text{engine output energy (2000RPM, 100 Nm: 20.9 kW)} - \text{running energy (15 kW)} \quad \text{Equation 4}$$

Referring to FIGS. 2 and 6, in an engine torque charge mode 240, the engine clutch 120 may be in a closed state and is driven by the engine 110, and a remaining torque thereof may be charged to the battery 140 using the first motor 130. However, when a charge amount of the battery 140 is further required, by increasing a torque of the engine 110, a charge amount of the battery 140 may increase by the first motor 130. In a conventional case, a charge amount of the first motor 130 may be represented with Equation 5.

$$\text{Charge amount (5.9 kW) of the first motor 130} = \text{engine output energy (2000RPM, 100 Nm: 20.9 kW)} - \text{running energy (15 kW)} \quad \text{Equation 5}$$

However, in the engine torque charge mode 240 according to an exemplary embodiment of the present invention, a charge amount of the first motor 130 may be represented with Equation 6. In other words, a charge amount of the first motor 130 in Equation 6 may be represented when increasing an engine torque from about 100 Nm to 120 Nm.

$$\text{Charge amount (10.1 kW) of the first motor 130} = \text{engine output energy (2000RPM, 120 Nm: 25.1 kW)} - \text{running energy (15 kW)} \quad \text{Equation 6}$$

Referring to FIG. 2, in a running charge mode 250, the engine clutch 120 may be configured to charge the battery 140 using the first motor 130 in a closed state. Particularly, the running charge mode 250 is a mode that charges or discharges the first motor 130 based on running energy and engine output energy in a running state. For example, when running energy is greater than engine output energy, the first motor 130 may be discharged. In addition, discharge energy is a value that subtracts engine output energy from running energy. When running energy is less than engine output energy, the battery 140 may be charged using the first motor 130. In particular, charge energy is a value that subtracts running energy from engine output energy.

Referring to FIGS. 2 and 7, in regenerative braking 260, the engine clutch 120 may be in an open state, and when a brake pedal is engaged by a driver to decelerate a vehicle speed, the battery 140 may be charged using the first motor 130. Upon the regenerative braking 260, a charge amount of the first motor 130 may be the same as deceleration energy applied to a driving wheel.

Hereinafter, a method of charging a battery in a hybrid vehicle according to an exemplary embodiment of the present invention will be described with reference to FIGS. 8 to 12. Controllers of the charge control apparatus according to an exemplary embodiment of the present invention that is described with reference to FIG. 1 may be integrated or subdivided, and controllers that perform the above-described function regardless of a corresponding name may be a constituent element of the charge control apparatus according to an exemplary embodiment of the present invention. Therefore, when describing a method of controlling charge in a charge control apparatus according to an exemplary embodiment of the present invention, a subject of each step is a charge control apparatus instead of corresponding controllers and the charge control apparatus will be mainly described.

Figure 8:
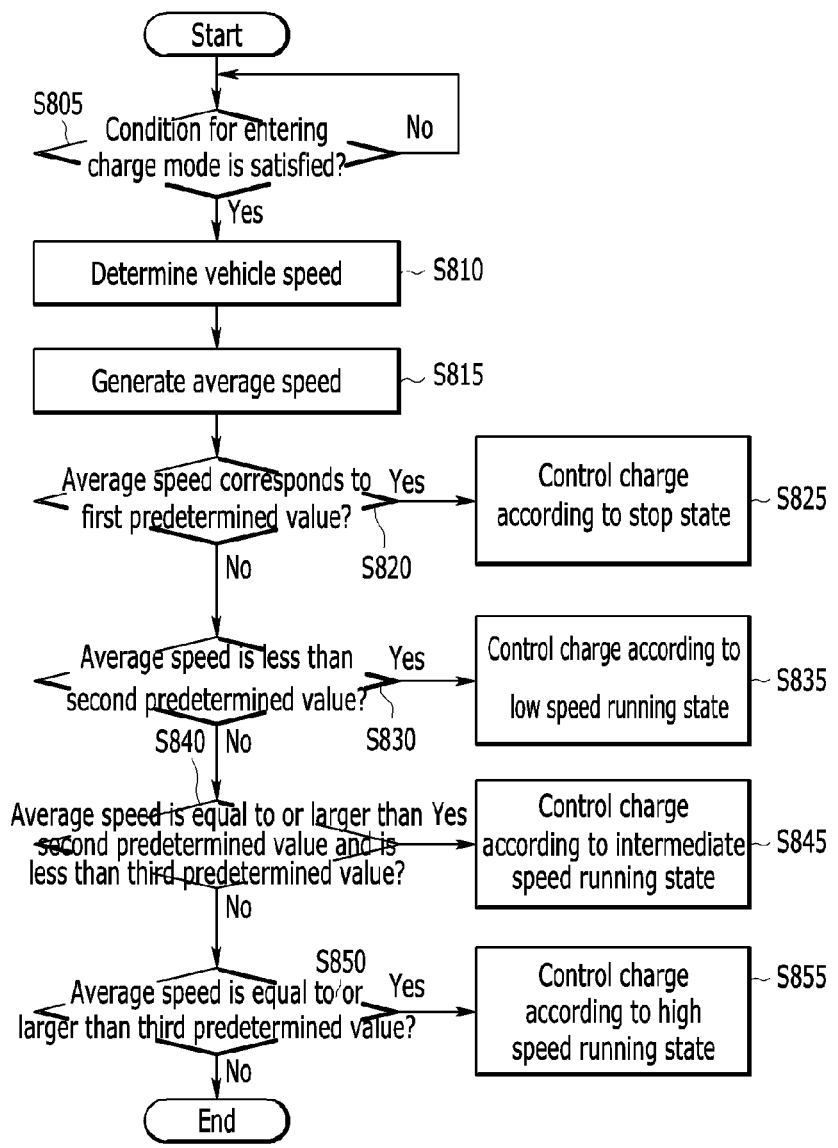
FIG. 8 is a flowchart illustrating a method of controlling charge of a hybrid vehicle according to an exemplary embodiment of the present invention.

FIG. 8 is a flowchart illustrating a method of controlling charge of a hybrid vehicle according to an exemplary embodiment of the present invention, and FIG. 9 is a table illustrating a charge mode according to a running state according to an exemplary embodiment of the present invention. Referring to FIG. 8, the charge control apparatus 100 may be configured to determine whether a condition for entering a charge mode is satisfied (S805). In other words, the charge control apparatus 100 may be configured to determine whether an entrance condition of a charge mode is satisfied based on an input signal when a button for entering a charge mode is engaged.

When an entrance condition of a charge mode is not satisfied, the process may return to step S805 and the charge control apparatus 100 may be configured to determine whether an entrance condition of a charge mode is satisfied. When an entrance condition of a charge mode is satisfied, the charge control apparatus 100 may be configured to determine a vehicle speed of driving data (S810). In particular, the charge control apparatus 100 may be configured to measure a vehicle speed at every measurement time. A measurement time may represent a time set to measure a vehicle speed and may be, for example, one minute or one second.

The charge control apparatus 100 may be configured to generate an average speed based on the vehicle speed (S815). In other words, the charge control apparatus 100 may be configured to calculate an average speed based on a vehicle speed measured at every measurement time for a predetermined time. The charge control apparatus 100 may be configured to determine whether the average speed corresponds to a first predetermined value (S820). Particularly, the first predetermined value may be a reference value used to determine whether the vehicle is in a stop state and may be set through predetermined algorithm (e.g., program and probability model). For example, the first predetermined value may be 0.

When the average speed corresponds to a first predetermined value, the charge control apparatus 100 may be configured to determine a stop state and adjust charge according to the stop state (S825). In other words, when the average speed corresponds to a first predetermined value, the charge control apparatus 100 may be configured to charge the battery 140 in an idle charge mode based on a stop state. When the average speed does not correspond to a first predetermined value, the charge control apparatus 100 may be configured to determine whether the average speed is less than a second predetermined value (S830). Particularly, a second predetermined value may be a reference value used to determine whether the vehicle is in a low speed state and may be set through predetermined algorithm (e.g., program and probability model).

When the average speed is less than a second predetermined value, the charge control apparatus 100 may be configured to determine a low speed running state and adjust charge based on the low speed running state (S835). In other words, when the average speed is less than a second predetermined value, the charge control apparatus 100 may be configured to determine a low speed running state and charge the battery 140 based on an engine torque charge mode, a running charge mode, and regenerative braking corresponding to a charge mode based on the low speed running state, as shown in FIG. 9. As shown in FIG. 9, the charge control apparatus 100 may be configured to charge the battery 140 by selectively using at least one of an idle charge mode, an idle lock-up charge mode, and an engine speed charge mode based on a state of the hybrid vehicle. A method of selecting a charge mode in a low speed running state will be described in detail with reference to FIG. 10.

The charge control apparatus 100 may be configured to determine whether the average speed is between a second predetermined value and a third predetermined value (S840). In other words, the charge control apparatus 100 may be configured to determine whether the average speed is equal to or greater than a second predetermined value and is less than a third predetermined value. In particular, the third predetermined value may be a reference value used to determine an intermediate speed state and may be set through predetermined algorithm (e.g., program and probability model).

When the average speed is between a second predetermined value and a third predetermined value, the charge control apparatus 100 may be configured to determine an intermediate speed running state and adjust charge based on the intermediate speed running state (S845). In other words, when the average speed is between a second predetermined value and a third predetermined value, the charge control apparatus 100 may be configured to determine an intermediate speed running state and charge the battery 140 based on an engine torque charge mode, a running charge mode, and regenerative braking corresponding to a charge mode based on the intermediate speed running state, as shown in FIG. 9.

As shown in FIG. 9, the charge control apparatus 100 may be configured to charge the battery 140 by selectively using at least one of an idle lock-up charge mode and an engine speed charge mode based on a state of the hybrid vehicle. A method of selecting a charge mode in an intermediate speed running state will be described in detail with reference to FIG. 11. Further, as shown in FIG. 9, in an intermediate speed running state, an idle charge mode cannot be selected.

The charge control apparatus 100 may be configured to determine whether the average speed is equal to or greater than a third predetermined value (S850). The first predetermined value, the second predetermined value, and the third predetermined value each may be different values, and the first to third predetermined values may be changed according to constituent elements and driving data that are included in the hybrid vehicle.

When an average speed is equal to or greater than a third predetermined value, the charge control apparatus 100 may be configured to determine a high speed running state and adjust charge based on the high speed running state (S855). In other words, when an average speed is equal to or greater than a third predetermined value, the charge control apparatus 100 may be configured to determine a high speed running state and charge the battery 140 based on an engine torque charge mode, a running charge mode, and regenerative braking based on the high speed running state, as shown in FIG. 9.

As shown in FIG. 9, the charge control apparatus 100 may not charge the battery 140 through an idle charge mode but may be configured to charge the battery 140 by selectively using at least one of an idle lock-up charge mode and an engine speed charge mode according to a state of the hybrid vehicle. A method of selecting a charge mode in a high speed running state will be described in detail with reference to FIG. 12. The charge control apparatus 100 may be configured to determine whether a driver has requested deceleration based on a location value of a brake pedal (e.g., an engagement degree, or amount of pressure exerted onto the brake pedal) and may perform regenerative braking in response to a driver requested deceleration.

Figure 10:
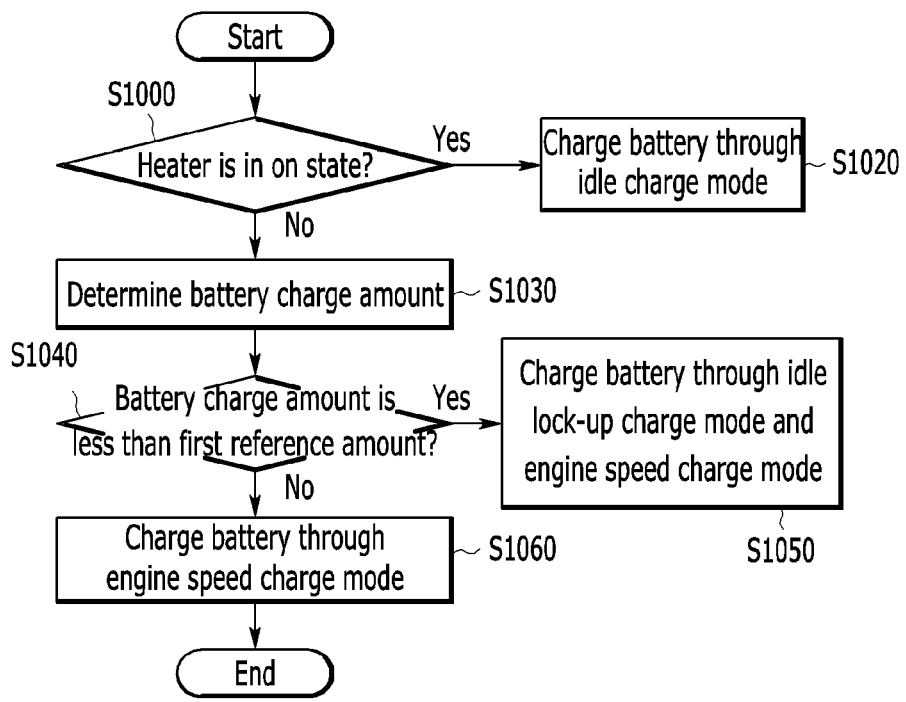
FIG. 10 is a flowchart illustrating a method of controlling charge upon low speed driving according to an exemplary embodiment of the present invention.

FIG. 10 is a flowchart illustrating a method of controlling charge upon low speed driving according to an exemplary embodiment of the present invention. Referring to FIG. 10, the charge control apparatus 100 may be configured to determine whether a heater is in an on state in a low speed running state (S1010). In other words, when an average speed is less than a second predetermined value, the charge control apparatus 100 may be configured to determine a low speed running state and determine whether a heater of the hybrid vehicle is in an on state.

When a heater is in an on state, the charge control apparatus 100 may be configured to charge the battery 140 using an idle charge mode (S1020). When a heater is in an off state, the charge control apparatus 100 may be configured to determine a battery charge amount (S1030). In particular, the battery charge amount represents an amount charged at the battery 140 per unit time. The battery charge amount may be generated based on at least one of battery charge and discharge currents and a charge time. In other words, a battery charge amount may be generated based on Equation 7.

$$C = \Sigma_{n-1}^{n} i \, di \quad \text{Equation 7}$$

wherein C represents a battery charge amount, i represents charge and discharge currents of the battery 140, n−1 represents a time in which charge is started, and n represents a time in which charge is terminated. For example, calculation of a battery charge amount for about 5 minutes may be represented with Equation 8.

$$C = \Sigma_{0}^{5} i \, di \quad \text{Equation 8}$$

The charge control apparatus 100 may be configured to determine whether a battery charge amount is less than a first reference amount (S1040). Particularly, the first reference amount may represent a value to be a reference to select a charge mode in a low speed running state. When a battery charge amount is less than a first reference amount, the charge control apparatus 100 may be configured to charge the battery 140 based on at least one of an idle lock-up charge mode and an engine speed charge mode (S1050). When a battery charge amount is equal to or greater than a first reference amount, the charge control apparatus 100 may be configured to charge the battery 140 using an engine speed charge mode (S1060). The selecting of an idle charge mode, an idle lock-up charge mode, and an engine speed charge mode is in a low speed running state since the battery 140 may not be charged with only the engine torque charge mode, the running charge mode, and regenerative braking since acceleration and deceleration situations of the vehicle are frequently changed upon low speed driving.

Figure 11:
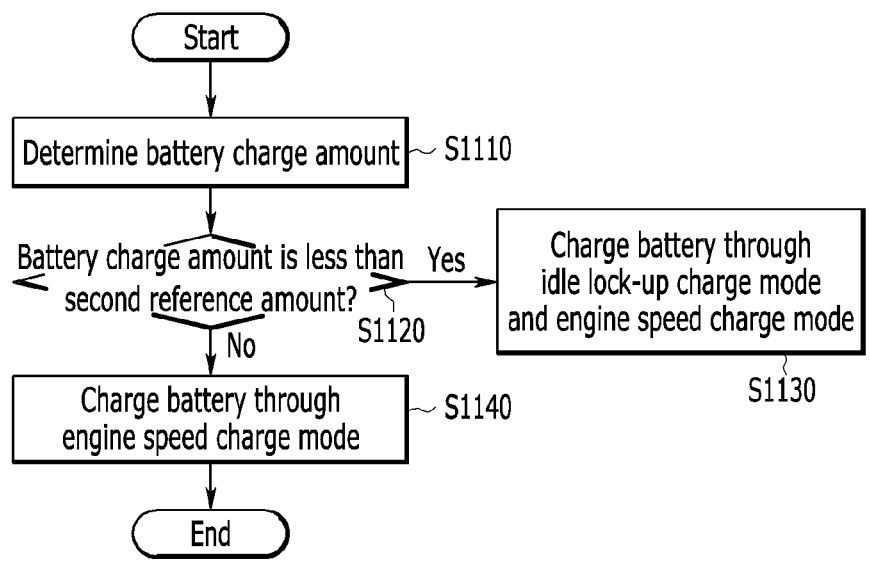
FIG. 11 is a flowchart illustrating a method of controlling charge upon intermediate speed driving according to an exemplary embodiment of the present invention.

FIG. 11 is a flowchart illustrating a method of controlling charge upon intermediate speed driving according to an exemplary embodiment of the present invention. Referring to FIG. 11, the charge control apparatus 100 may be configured to determine a battery charge amount in an intermediate speed running state (S1110). In other words, when an average speed is between a second predetermined value and a third predetermined value, the charge control apparatus 100 may be configured to determine an intermediate speed running state and generate a battery charge amount based on battery charge and discharge currents and a charge time in the intermediate speed running state.

The charge control apparatus 100 may be configured to determine whether a battery charge amount is less than a second reference amount (S1120). The second reference amount may represent a reference value used to select a charge mode based on a battery charge amount in an intermediate speed running state. When a battery charge amount is less than a second reference amount, the charge control apparatus 100 may be configured to charge the battery 140 based on at least one of an idle lock-up charge mode and an engine speed charge mode (S1130). When a battery charge amount is equal to or greater than a second reference amount, the charge control apparatus 100 may be configured to charge the battery 140 using an engine speed charge mode (S1140).

Figure 12:
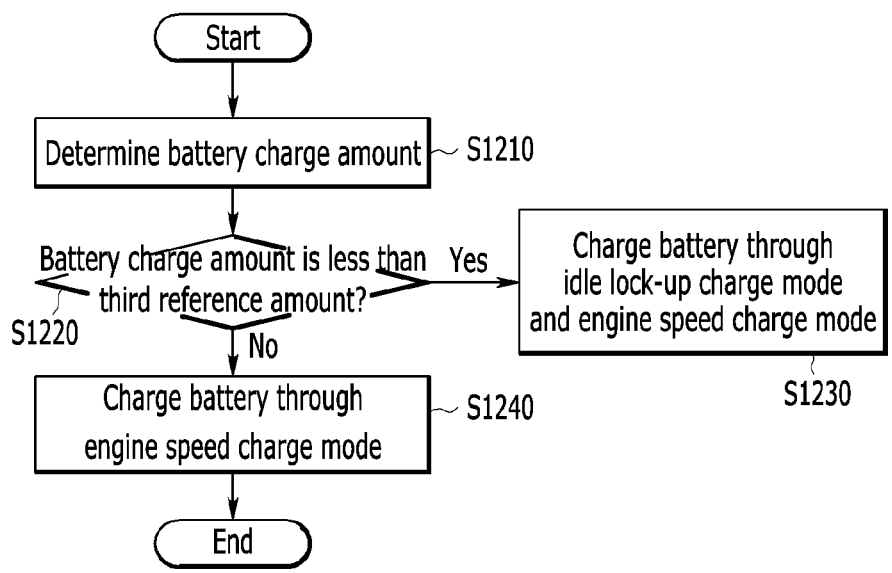
FIG. 12 is a flowchart illustrating a method of controlling charge upon high speed driving according to an exemplary embodiment of the present invention.

FIG. 12 is a flowchart illustrating a method of controlling charge upon high speed driving according to an exemplary embodiment of the present invention. Referring to FIG. 12, the charge control apparatus 100 may be configured to determine a battery charge amount in a high speed running state (S1210). In other words, when an average speed is equal to or greater than a third predetermined value, the charge control apparatus 100 may be configured to determine a high speed running state and determine a battery charge amount per unit time. Particularly, the charge control apparatus 100 may be configured to calculate based on at least one of battery charge and discharge currents and a charge time.

The charge control apparatus 100 may be configured to determine whether a battery charge amount is less than a third reference amount (S1220). In particular, the third reference amount may represent a reference value used to select a charge mode in a high speed running state. When a battery charge amount is less than a third reference amount, the charge control apparatus 100 may be configured to charge the battery 140 using at least one of an idle lock-up charge mode and an engine speed charge mode (S1230). When a battery charge amount is equal to or greater than a third reference amount, the charge control apparatus 100 may be configured to charge the battery 140 using an engine speed charge mode (S1240).

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100: charge control apparatus of hybrid vehicle
110: engine
130: first motor
135: second motor
140: battery

150: transmission
160: ECU
170: MCU
180: TCU
200: HCU

What is claimed is:

1. A charge control apparatus of a hybrid vehicle, comprising:
 an engine clutch disposed between an engine and a first motor to selectively connect the engine and the first motor;
 a battery configured to provide a voltage to the first motor;
 a data detection unit configured to detect driving data for charging the battery; and
 a vehicle controller configured to generate an average speed for a predetermined time using a vehicle speed of the driving data, and set a charge mode based on the average speed, and charge the battery using the charge mode,
 wherein the vehicle controller is configured to determine whether a heater is in an on state, when the average speed is less than a second predetermined value, and the vehicle controller is configured to charge the battery through an idle charge mode, which is a low speed charge mode, when a heater is in an on state.

2. The charge control apparatus of claim 1, wherein the vehicle controller is configured to determine a stop state and charge the battery through an idle charge mode based on the stop state, when the average speed is a first predetermined value.

3. The charge control apparatus of claim 2, wherein in the idle charge mode, the engine clutch is in an open state, and the battery is charged based on at least one of a first motor and a second motor.

4. The charge control apparatus of claim 1, wherein the vehicle controller is configured to determine a low speed running state and charge the battery using at least one of an engine torque charge mode, a running charge mode, and regenerative braking based on the low speed running state, when the average speed is less than a second predetermined value.

5. The charge control apparatus of claim 4, wherein in the engine torque charge mode, the engine clutch is in a closed state, the battery is charged based on a first motor by increasing an output torque of the engine, and in the running charge mode, the engine clutch is in a closed state, the battery is charged based on the first motor, when running energy is greater than output energy of the engine.

6. The charge control apparatus of claim 1, wherein the vehicle controller is configured to determine whether a battery charge amount is less than a first reference amount, when the heater is in an off state, charge the battery using at least one of an idle lock-up charge mode and an engine speed charge mode, when the battery charge amount is less than a first reference amount, and charge the battery using an engine speed charge mode, when the battery charge amount is equal to or greater than a first reference amount.

7. The charge control apparatus of claim 6, wherein in the idle lock-up charge mode, the engine clutch is in a closed state, the battery is charged using the first motor by driving the engine, and in the engine speed charge mode, the engine clutch is in a closed state, by increasing a rotation speed of the engine, the battery is charged using the first motor.

8. The charge control apparatus of claim 1, wherein the vehicle controller is configured to determine an intermediate speed running state, when the average speed is between a second predetermined value and a third predetermined value and charge the battery using at least one of an engine torque charge mode, a running charge mode, and regenerative braking in an intermediate speed charge mode or a high speed charge mode based on the intermediate speed running state.

9. The charge control apparatus of claim 8, wherein the vehicle controller is configured to determine a battery charge amount, when the average speed is between a second predetermined value and a third predetermined value, charge the battery using at least one of an idle lock-up charge mode and an engine speed charge mode, when the battery charge amount is less than a second reference amount, and charge the battery using an engine speed charge mode, when the battery charge amount is equal to or greater than a second reference amount.

10. The charge control apparatus of claim 1, wherein the vehicle controller is configured to determine a high speed running state, when the average speed is equal to or greater than a third predetermined value and charge the battery using at least one of an engine torque charge mode, a running charge mode, and regenerative braking in an intermediate speed charge mode or a high speed charge mode based on the high speed running state.

11. The charge control apparatus of claim 10, wherein the vehicle controller is configured to determine a battery charge amount, when the average speed is equal to or greater than a third predetermined value, charge the battery using at least one of an idle lock-up charge mode and an engine speed charge mode, when the battery charge amount is less than a third reference amount, and charge the battery using an engine speed charge mode, when the battery charge amount is equal to or greater than a third reference amount.

12. A method of controlling charge of a hybrid vehicle, comprising:
 measuring, by a controller, a vehicle speed;
 generating, by the controller, an average speed for a predetermined time using the vehicle speed;
 adjusting, by the controller, when the average speed is a first predetermined value, to a stop state charge mode;
 adjusting, by the controller, when the average speed is less than or equal to a second predetermined value, to a low speed running state charge mode;
 adjusting, by the controller, when the average speed is between the second predetermined value and a third predetermined value, to an intermediate speed running state charge mode; and
 adjusting, by the controller, when the average speed is equal to or greater than a third predetermined value, to a high speed running state charge mode,
 wherein the adjusting of to a low speed running state charge mode includes:
  determining, by the controller, when the average speed is less than or equal to a second predetermined value, whether a heater is in an on state; and
  charging by the controller, when a heater is in an on state, the battery using an idle charge mode.

13. The method of claim 12, wherein the adjusting of to a stop state charge mode includes charging the battery using an idle stop state charge mode, when the average speed is a first predetermined value.

14. The method of claim 12, wherein the adjusting of to a low speed running state charge mode includes charging the battery using at least one of an engine torque charge mode, a running charge mode, and regenerative braking based on the low speed running state, when the average speed is less than or equal to a second predetermined value.

15. The method of claim 12, further comprising, after the determining of whether a heater is in an on state:
- determining, by the controller, when the heater is in an off state, a battery charge amount;
- determining, by the controller, whether the battery charge amount is less than a first reference amount; and
- charging, by the controller, when the battery charge amount is less than a first reference amount, the battery using at least one of an idle lock-up charge mode and an engine speed charge mode.

16. The method of claim 15, further comprising charging, by the controller, when the battery charge amount is equal to or greater than a first reference amount, the battery using an engine speed charge mode, after the determining of whether the battery charge amount is less than a first reference amount.

17. The method of claim 12, wherein the adjusting of to an intermediate speed running state charge mode includes charging, when the average speed is between a second predetermined value and a third predetermined value, the battery using at least one of the engine torque charge mode, the running charge mode, and the regenerative braking based on an intermediate speed running state.

18. The method of claim 12, wherein the adjusting of to an intermediate speed running state charge mode includes:
- determining, by the controller, when the average speed is between a second predetermined value and a third predetermined value, a battery charge amount;
- determining, by the controller, whether the battery charge amount is less than a second reference amount; and
- charging, by the controller, when the battery charge amount is less than a second reference amount, the battery using at least one of an idle lock-up charge mode and an engine speed charge mode.

19. The method of claim 18, further comprising charging, the controller, when the battery charge amount is equal to or greater than a second reference amount, the battery using an engine speed charge mode, after the determining of whether the battery charge amount is less than a second reference amount.

20. The method of claim 12, wherein the adjusting of to a high speed running state charge mode includes charging, when the average speed is equal to or greater than a third predetermined value, the battery using at least one of an engine speed charge mode, a running charge mode, and regenerative braking.

21. The method of claim 12, wherein the adjusting of to a high speed running state charge mode includes:
- determining, by the controller, when the average speed is equal to or greater than a third predetermined value, a battery charge amount;
- determining, by the controller, whether the battery charge amount is less than a third reference amount; and
- charging, by the controller, when the battery charge amount is less than a third reference amount, the battery using at least one of an idle lock-up charge mode and an engine speed charge mode.

22. The method of claim 21, further comprising charging, by the controller, the battery using an engine speed charge mode, when the battery charge amount is equal to or greater than a third reference amount, after the determining of whether the battery charge amount is less than a third reference amount.

* * * * *